No. 609,211. Patented Aug. 16, 1898.
G. L. PUTNAM & C. H. FARMER.
MAGAZINE BOLT GUN.
(Application filed Apr. 21, 1898.)
(No Model.) 8 Sheets—Sheet 3.
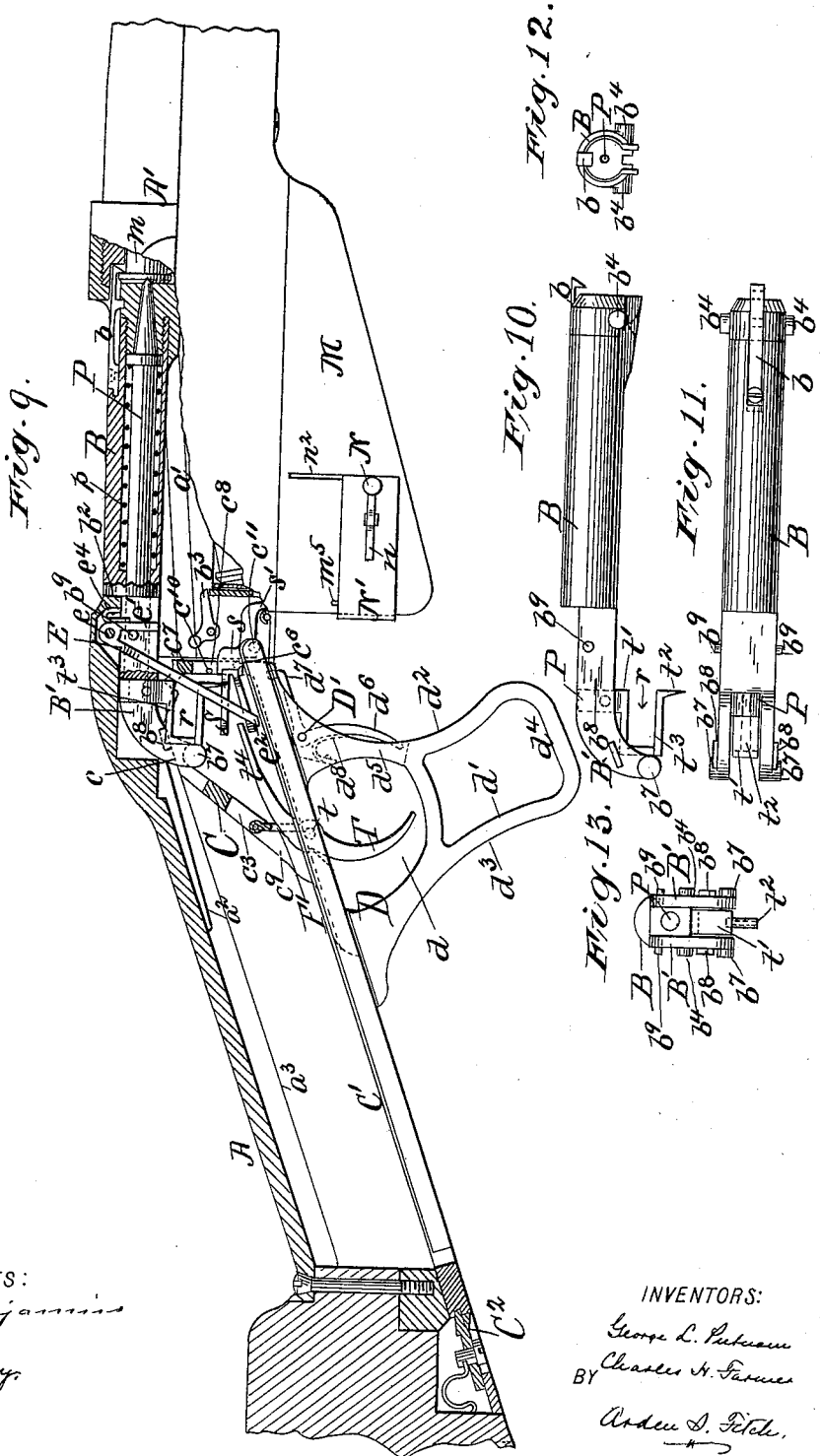
WITNESSES:
INVENTORS:
George L. Putnam
Charles H. Farmer
BY
Arden S. Fitch,
ATTORNEY

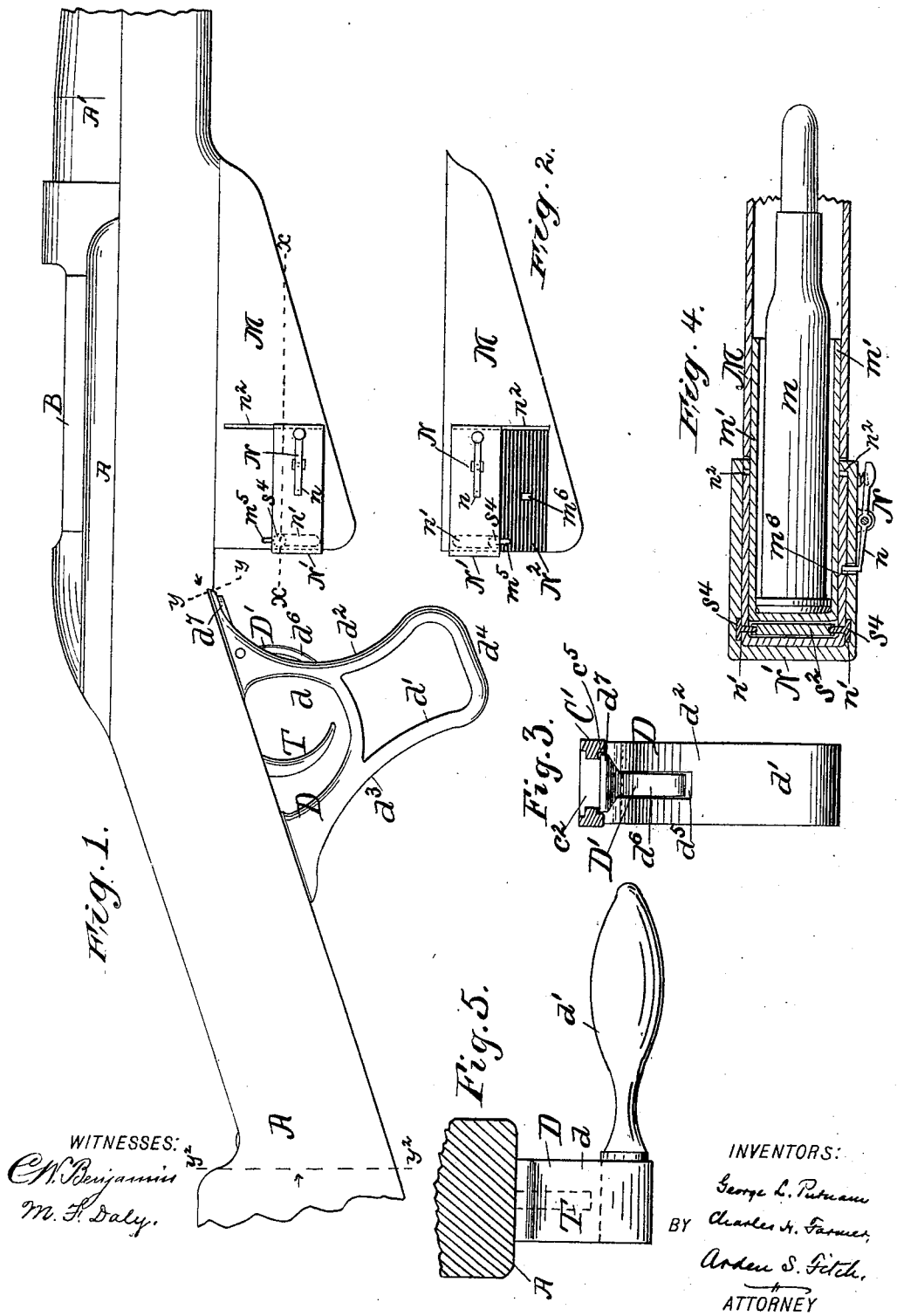
No. 609,211. Patented Aug. 16, 1898.
G. L. PUTNAM & C. H. FARMER.
MAGAZINE BOLT GUN.
(Application filed Apr. 21, 1898.)
(No Model.) 8 Sheets—Sheet 1.

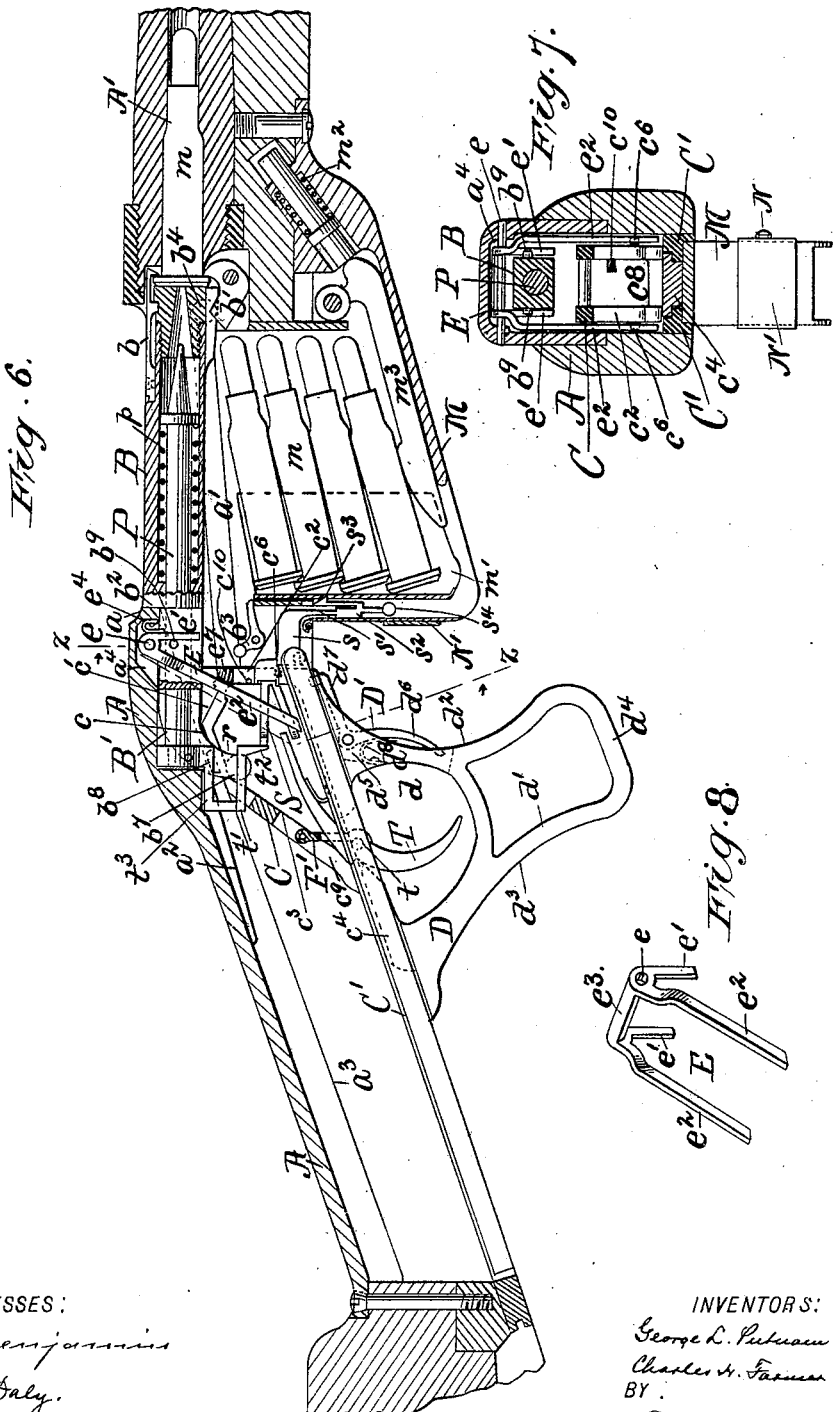

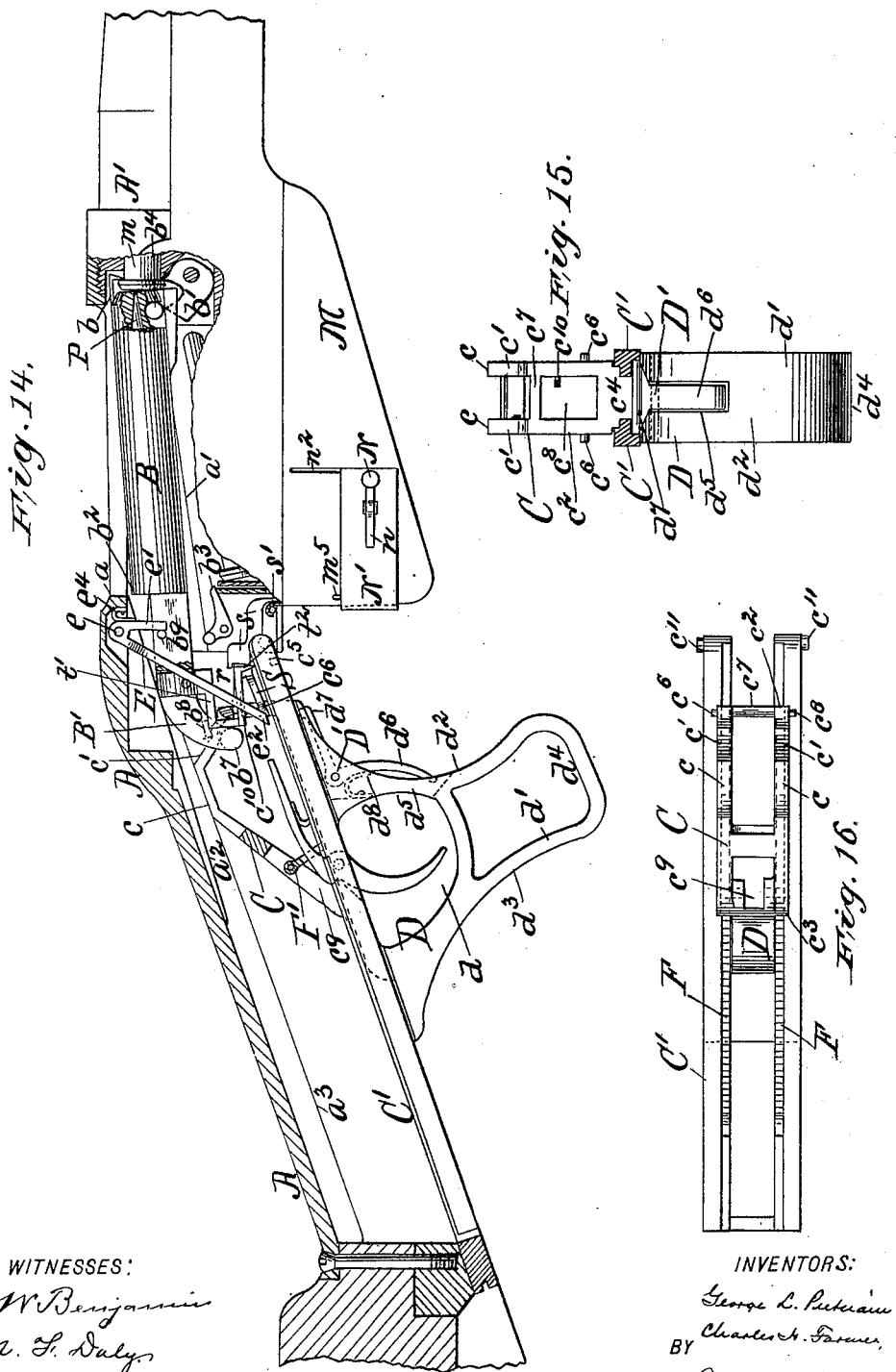

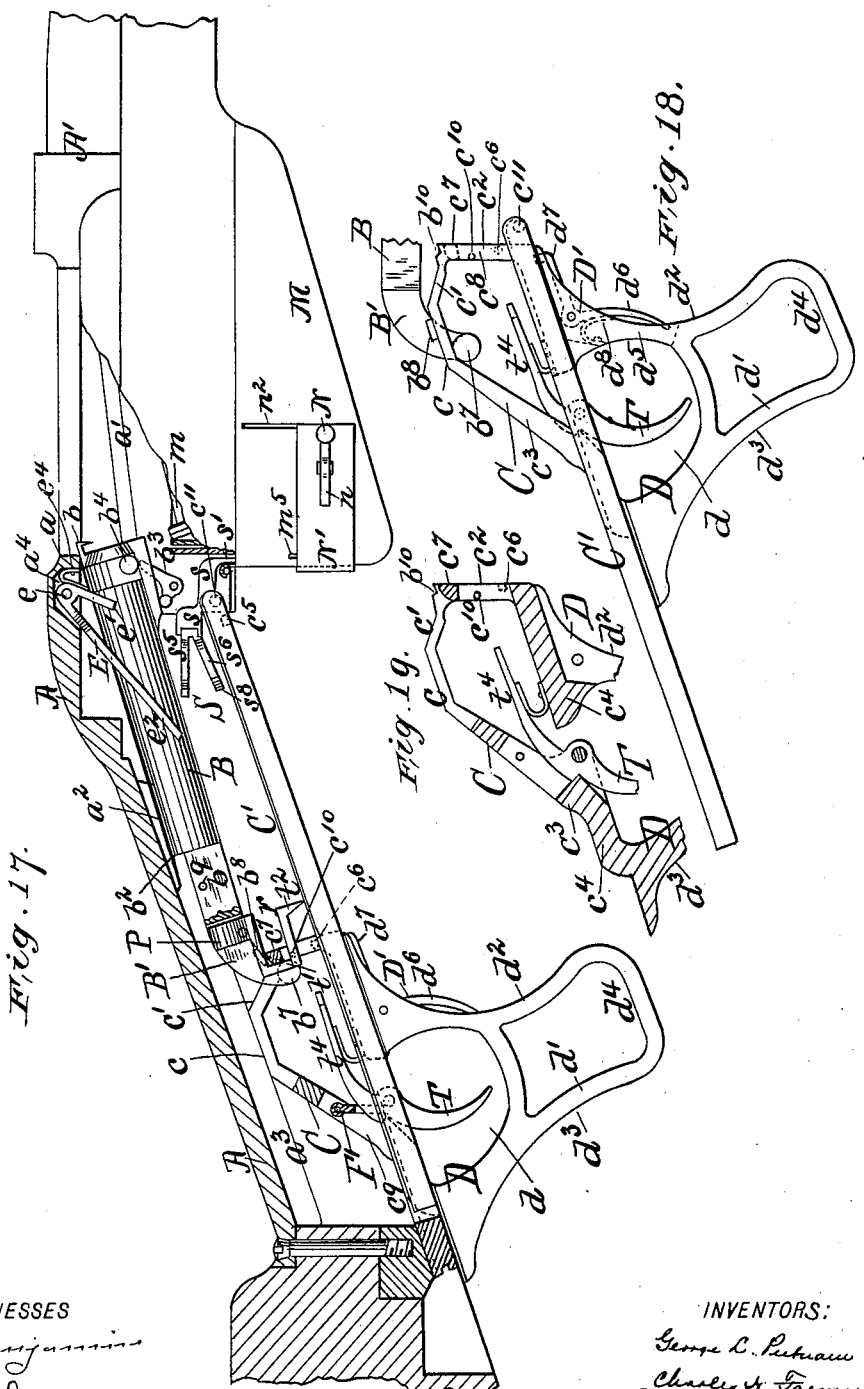

No. 609,211. Patented Aug. 16, 1898.
G. L. PUTNAM & C. H. FARMER.
MAGAZINE BOLT GUN.
(Application filed Apr. 21, 1898.)
(No Model.) 8 Sheets—Sheet 6.
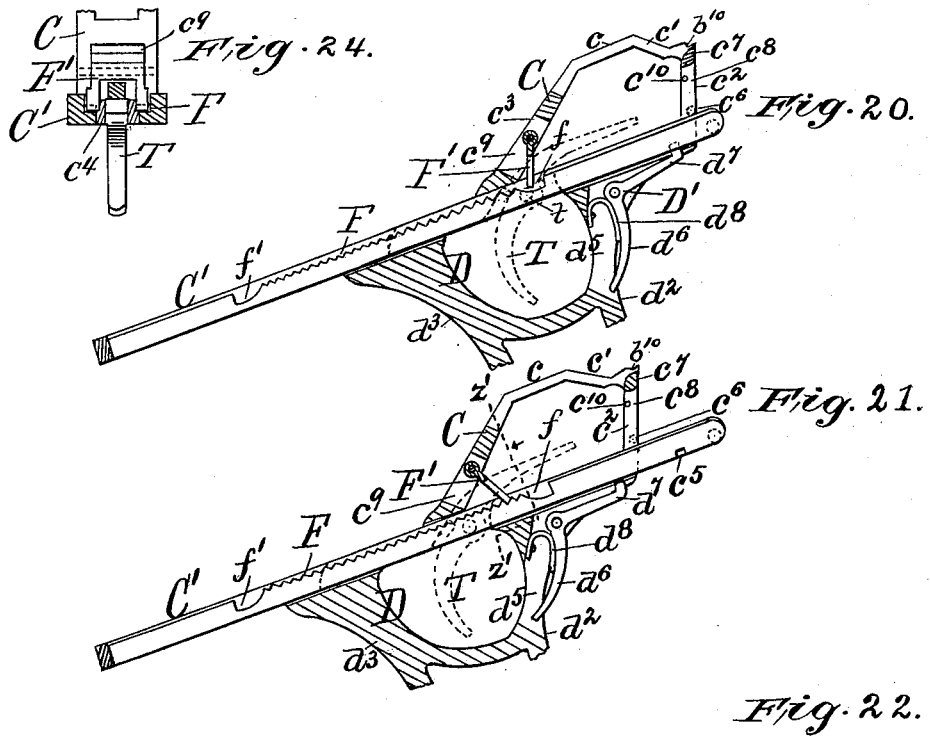
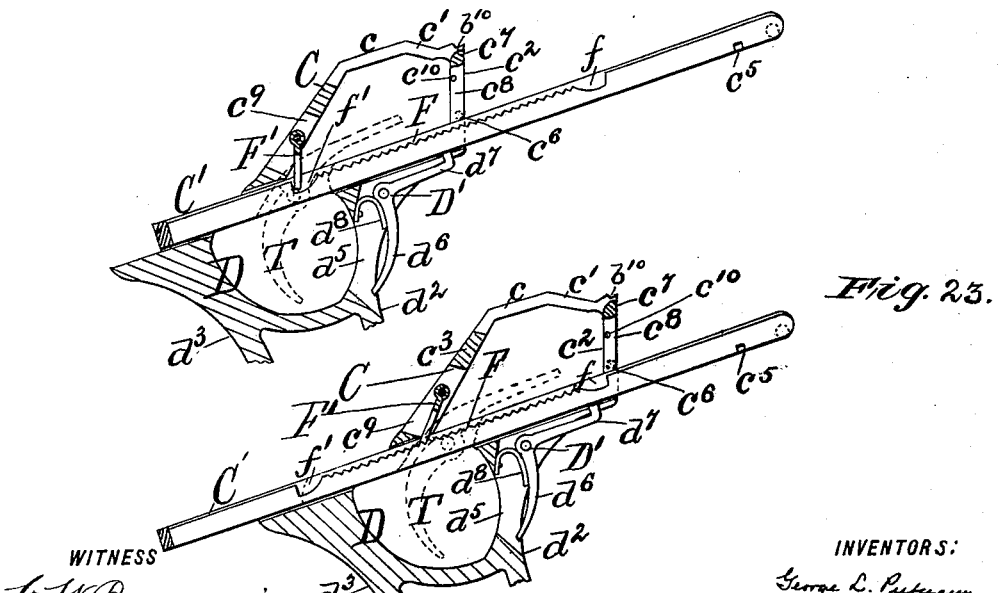

No. 609,211. Patented Aug. 16, 1898.
G. L. PUTNAM & C. H. FARMER.
MAGAZINE BOLT GUN.
(Application filed Apr. 21, 1898.)
(No Model.) 8 Sheets—Sheet 7.
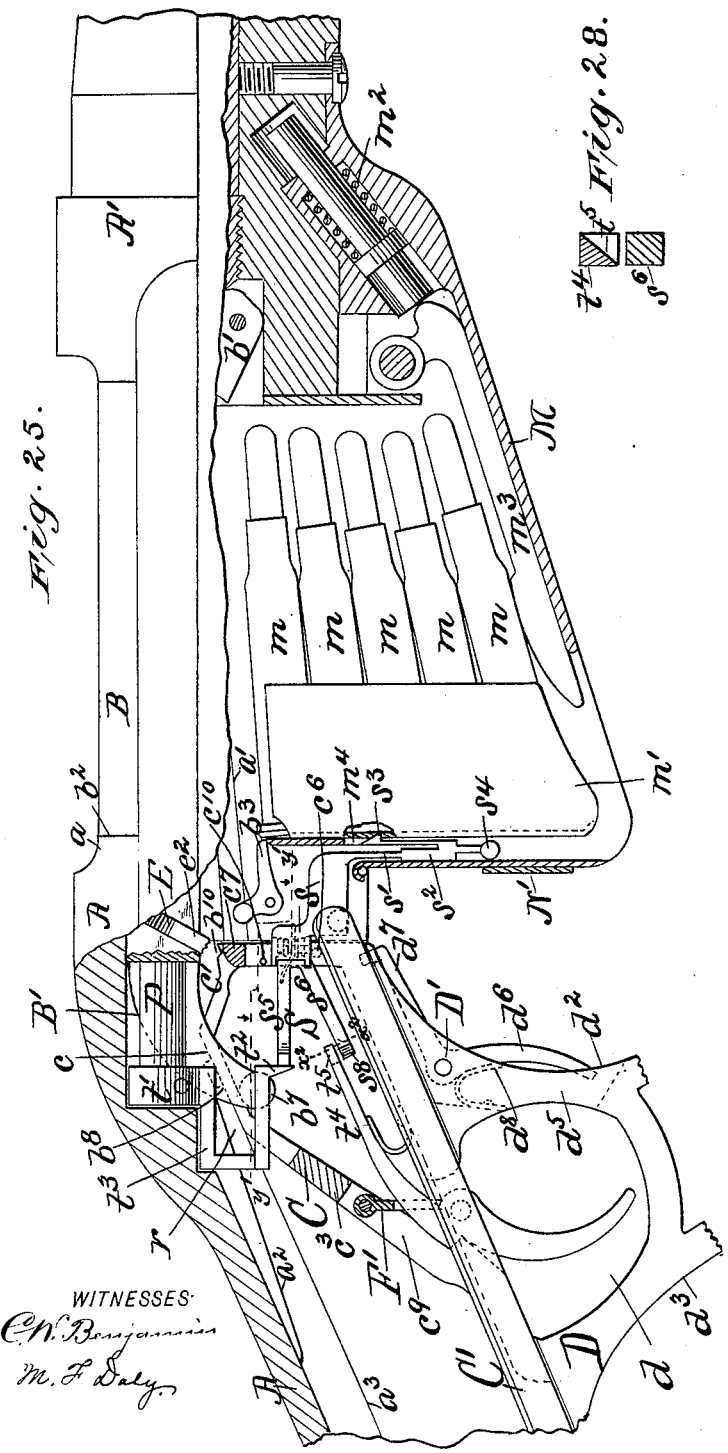
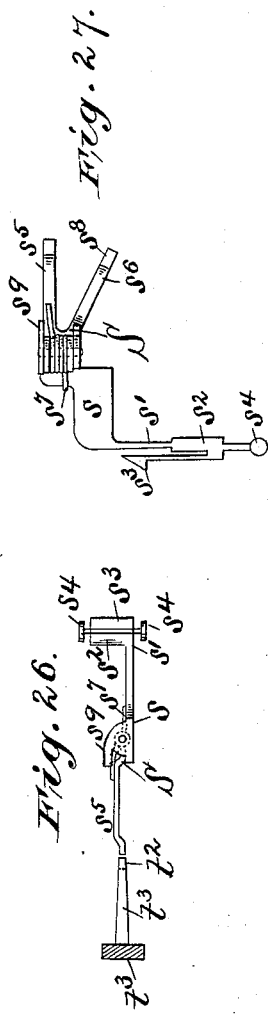
WITNESSES
INVENTORS:
George L. Putnam
Charles H. Farmer
BY
Arden I. Fitch,
ATTORNEY No. 609,211. Patented Aug. 16, 1898.
G. L. PUTNAM & C. H. FARMER.
MAGAZINE BOLT GUN.
(Application filed Apr. 21, 1898.)
(No Model.) 8 Sheets—Sheet 8.
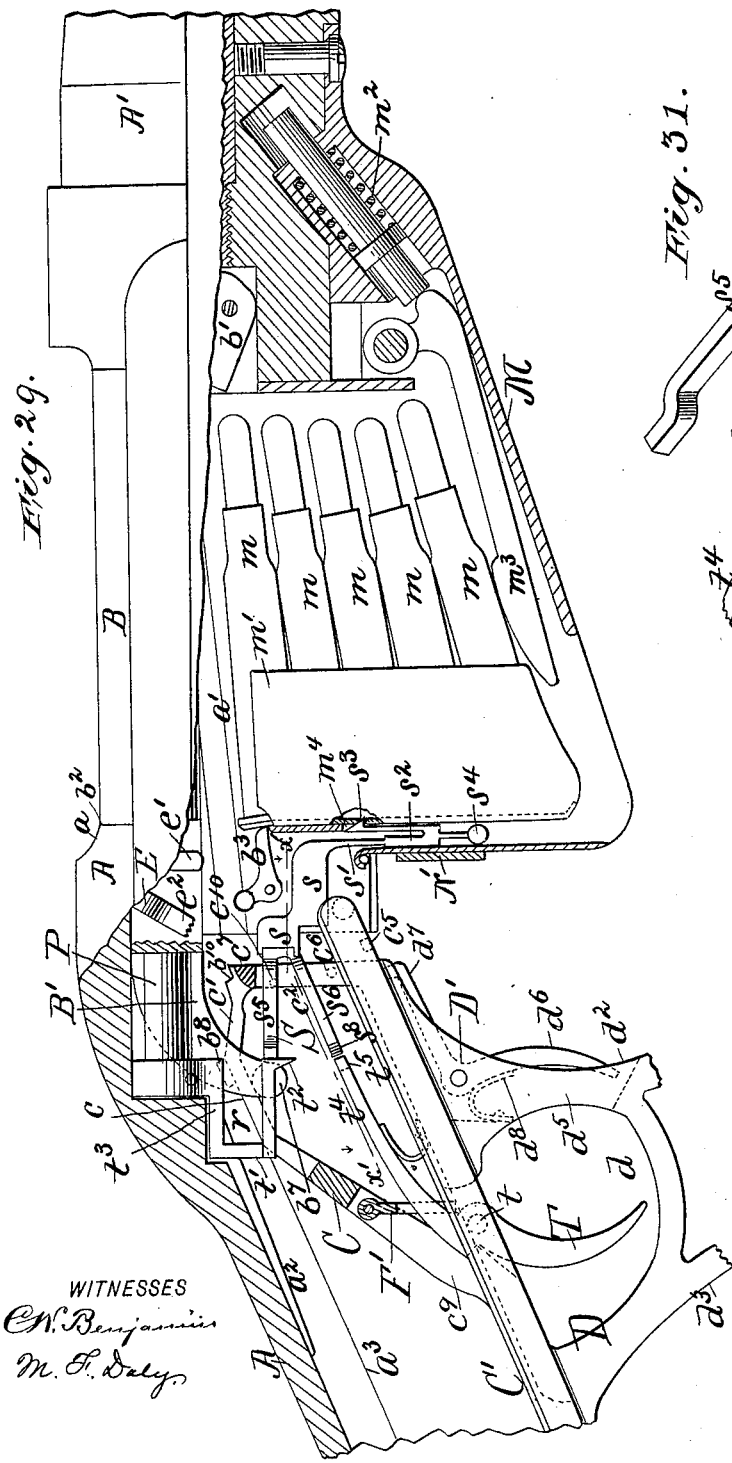
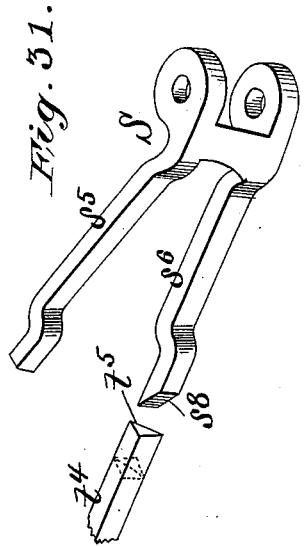
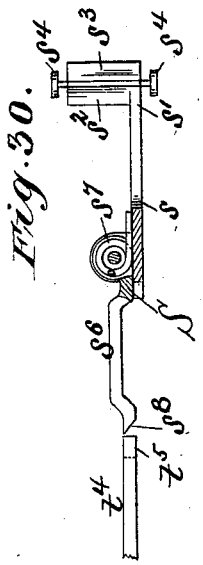
WITNESSES
INVENTORS:
George L. Putnam
Charles H. Farmer
BY
Arden S. Filch
ATTORNEY

United States Patent Office.

GEORGE L. PUTNAM AND CHARLES H. FARMER, OF NEW YORK, N. Y.

MAGAZINE BOLT-GUN.

SPECIFICATION forming part of Letters Patent No. 609,211, dated August 16, 1898.

Application filed April 21, 1898. Serial No. 678,343. (No model.)

*To all whom it may concern:*

Be it known that we, GEORGE L. PUTNAM and CHARLES H. FARMER, citizens of the United States, and residents of the city of New York, county and State of New York, have invented certain new and useful Improvements in Firearms, of which the following is a full, clear, and exact description, reference being had to the accompanying drawings, forming part of this specification.

Our invention relates to that class of magazine breech-loading guns known as "bolt-guns," and more particularly to such guns in which the breech-bolt and its actuator device are capable of a generally reciprocatory movement in the receiver and the breech-bolt-actuator device is operated by a grip capable of reciprocation on the exterior of the gun by a "straight-pull" movement and in which the said bolt carries a spring-impelled firing-pin. In guns of this class it is regarded as important for their effective use in firing from the magazine that the gun should be capable of being continuously maintained at the shoulder and the "line of sight" preserved during the successive discharges of the entire magazine reserve of cartridges; and the primary object of our invention is to provide a gun in the manipulation of the operative mechanism of which the physical effort demanded of the soldier shall be so minimized that any necessity to remove the gun from the shoulder in order to effect such manipulation is obviated.

A further object of our invention is to provide a gun in which the magazine mechanism and the firing mechanism are simultaneously fixedly adjustable to hold the magazine out of use and enable the firing of a cartridge in the firing-chamber to be effected only by a vibration of the trigger or to hold the magazine in use and enable the firing of the gun to be automatically effected by the trigger in the manipulation of the operative mechanism to open and close the breech-aperture, whereby the gun may be optionally used as a breech-loader to fire cartridges loaded singly from the belt by a distinct manipulation of the trigger or as a magazine-repeater to successively fire the cartridges held in the magazine by the manipulation only of the breech-bolt-actuating devices, and whereby the adjustment of the gun from "single" to "magazine" fire may be effected while the gun mechanism is in any position which it may properly assume during its operation.

A further object of our invention is to provide means to facilitate the extraction of cartridge-shells from the firing-chamber, whereby a multiple of the effort exerted upon the operative mechanism for this purpose will be exerted upon the seated shell, and consequently the minimizing of effort demanded in the manipulation of the gun be promoted.

A further object of our invention is to provide a grip device for the operation of the reciprocatory breech-bolt actuator which is capable of manipulation in a straight-pull movement on the receiver in a manner most convenient to the soldier in the exertion of effort while the gun is at the shoulder, to effect such movement of said grip device, and in effecting such movement, of which the liability to simultaneously manipulate the firing-trigger is minimized, and also in effecting a throw of which in the direction to open the breech-aperture the liability to initiate such throw until a determinate interval of time elapses after the gun is fired is likewise minimized, whereby the liability that the soldier will fire the gun "convulsively" or will be subjected to the danger of "hang-fires" is practically obviated.

A further object of our invention is to provide means by which when a movement of the breech-bolt in either direction to open or close the breech is initiated it must be pursued and completed before any movement of said bolt in the reverse direction can be made, whereby the liability that the bolt, as in a reciprocation thereof, will in its closing movement engage and force to or into the firing-chamber a live cartridge before in its opening movement it has effected the extraction and ejection of the spent shell will be avoided, and consequently the "double loading" of the gun be prevented; and a further object of our invention is to provide means to visually indicate by a distinct signal on the exterior of the gun the adjustment of the gun mechanism for either magazine or single fire, whereby the use of the magazine in firing may be recognized, as by an officer in command.

Figure 1 is a side elevation of the receiver of a gun containing our invention and illustrating the preferable form of our grip device and the visual appearance of the magazine-case when the gun mechanism is adjusted for single fire as a breech-loader. Fig. 2 is a similar view of the magazine-case in detail, illustrating the visual appearance thereof when the gun mechanism is adjusted for magazine fire. Fig. 3 is a vertical cross-section on the line $y\,y$, Fig. 1, through the under side of the receiver, looking rearwardly and showing the grip in its preferable form. Fig. 4 is a horizontal section, enlarged, through the magazine on line $x\,x$, Fig. 1, looking downwardly. Fig. 5 is a vertical cross-section on the line $y^2\,y^2$, Fig. 1, looking forwardly and illustrating a modified form of our grip. Fig. 6 is a vertical longitudinal central section through the receiver and showing the several parts of the mechanism in position when the magazine is adjusted to be out of use and the gun is adapted for use as a breech-loader in single firing, as from the cartridge-belt, and is cocked ready to fire. Fig. 7 is a vertical cross-section on the line $z\,z$, Fig. 5, through the receiver, looking forwardly toward the firing-chamber and magazine. Fig. 8 is a perspective view in detail of our auxiliary cartridge-shell starter in its preferable form. Fig. 9 is a sectional view similar to that of Fig. 6, but showing the several parts of the mechanism in position immediately after the gun has been fired. Fig. 10 is a side elevation of the breech-bolt. Fig. 11 is a plan of the same. Fig. 12 is a front end elevation of the same. Fig. 13 is a rear end elevation of the same. Fig. 14 is a sectional view similar to that of Fig. 6, but showing the several parts of the mechanism in position after the grip has been initially manipulated to unlock the breech-bolt and said bolt is ready to be retracted in the receiver by the further pull on the grip. Fig. 15 is a forward face elevation of the grip and its connected breech-bolt actuator or sliding frame and showing said frame and grip mounted on their guides or ways, which are illustrated in cross-section detached from the gun-stock. Fig. 16 is a plan of the parts shown in Fig. 15. Fig. 17 is a sectional view similar to that of Fig. 6, but showing the several parts of the mechanism in position when the breech-bolt has been retracted by the actuator and grip to the limit of movement in the receiver to open the breech-aperture, the spent shell from the firing-chamber has been ejected, and the breech-bolt is ready to be projected to close the breech-aperture by the forward thrust of the grip, thereby effecting the insertion of a fresh cartridge in the firing-chamber, the seating and locking of the bolt in the breech-aperture, and the cocking of the gun, and thus bringing the several parts of the mechanism again into the positions illustrated in Fig. 6. Fig. 18 is a side elevation in detail of the breech-bolt-actuator frame and its connected grip and their attached devices and the guides or ways on which said frame reciprocates. Fig. 19 is a longitudinal central section in detail, taken vertically through the said frame and grip. Figs. 20, 21, 22, and 23 are similar sections through the said frame on its ways and illustrating our device for preventing double loading, the frame and its grip being shown at the limit of forward movement on the ways in Fig. 20, at the limit of rearward movement on said ways in Fig. 22, and during the intervals of rearward and forward movement on said ways, respectively, in Figs. 21 and 23. Fig. 24 is a vertical cross-section on the line $z'\,z'$, Fig. 21, through the said frame and its guides or ways, looking rearwardly, the grip being omitted. Fig. 25 is an enlarged vertical longitudinal sectional view of the magazine and the forward part of the receiver, showing the various parts in position when the devices common to and adapted to control the magazine and firing mechanism are fixed to adjust the magazine out of use and to permit the gun to be loaded at the breech, as from the belt in single firing, and to be fired by the distinct manipulation of the trigger in the usual manner, the gun being shown cocked and ready to fire. Fig. 26 is a plan, partly in section, taken on the line $y'\,y'$, Fig. 25, looking downwardly and showing a form and arrangement of sear which may be employed as part of the firing mechanism, together with devices which may be common to said sear and the magazine mechanism and useful in controlling and adjusting the same in accordance with our invention. Fig. 27 is a side elevation of the same parts viewed from the reverse side thereof to that illustrated in Fig. 25. Fig. 28 is an enlarged vertical cross-section taken on the line $x^2\,x^2$, Fig. 25, through the trigger member or arm of the form of sear shown in Figs. 26 and 27 and the nose of the trigger which may be employed in connection therewith. Fig. 29 is a sectional view similar to that of Fig. 25, but showing the several parts of the mechanism in position when the magazine mechanism and the firing mechanism are simultaneously adjusted to bring the magazine into use in firing and to permit the automatic firing of the gun to be effected by the operation of the breech-bolt actuator, the gun being shown about to be fired by the conclusion of a movement of said actuator device in the direction to project the breech-bolt into the breech-aperture. Fig. 30 is a plan, partly in section, taken on the line $x'\,x'$, Fig. 29, looking downwardly, showing the sear and trigger in the same relative positions as those illustrated in Fig. 29. Fig. 31 is an enlarged perspective view in detail of the form of sear and trigger-nose illustrated in the preceding figures.

In the gun illustrated in the drawings, A is the receiver, A' the firing-chamber, and B the breech-bolt, provided with the spring-impelled firing-pin P and with devices, such as the usual ones shown at $b$ and $b'$, for gripping the rim of and tending to extract the cartridge-shell from the firing-chamber when the bolt is retracted to open the breech-aperture, while a usual form of shell-ejector is shown at $b^3$, operated by a wing or wings on the under side of the forward end of the bolt in the well-known manner. The bolt B has vertical movement in the receiver to engage and disengage the lock-shoulder $a$ on the receiver by the shoulder $b^2$ on the bolt, and also has rectilinear reciprocatory movement to retract it from and project it into the breech-aperture, in which movement it is guided by ways $a'$ and $a^2$ on the receiver, engaged, respectively, by trunnions $b^4$ on the forward end of the bolt and by the upper side of the rearward end of the bolt itself. The breech-bolt actuator comprises a frame C, which reciprocates in the rearward part of the receiver on ways $C'$, located therein below the bolt in its play, and is guided by shoulders $a^3$ on the receiver parallel to said ways. The ways $C'$ may be detachably seated in the receiver by means of trunnions $c''$ on their forward ends removably fitting in sockets in the stock and a catch $C^2$ in the butt adapted to engage or disengage the rearward end of the ways, as plainly shown in Fig. 9. The breech-bolt may be directly engaged at its rearward end to the actuator or frame C—as, for example, by a depending tailpiece B', which is bifurcated to permit the play therein of the firing-pin and which tailpiece B' enters and plays in a slot in the upward part of said frame and has on its outward sides the laterally-projecting trunnions $b^7$ and lugs $b^8$, adapted to respectively engage and traverse the under and upper faces of the rectilinear top $c$ of said frame, which is parallel to the ways $C'$ thereof, and to similarly engage and traverse the under and upper faces of the downwardly and forwardly inclined portions $c'$ of the frame. A forward upright portion $c^2$ and a rearward and rearwardly-inclined portion $c^3$ of the frame, slotted to permit the play therein of further parts of the mechanism, sustain the described upward portions of the frame and rigidly unite them to the base $c^4$ thereof, said base being seated on and adapted to traverse the ways $C'$ and slotted to permit the play of the trigger T, which is fulcrumed in said base at $t$. The trigger is adapted to vibrate in one direction, as downwardly, against its controlling-spring and to be stopped in its reverse vibration under the stress of said spring against a shoulder on said frame-base, and thus rigidly held in normal position. The rectilinear portion $c$ of the frame-top is of a length to permit the trunnions $b^7$ to rest at the rearward end thereof when said frame is at the limit of its forward movement on its ways and the breech-bolt is projected into the breech-aperture and to permit a slight movement of said frame rearwardly or forwardly on said ways respectively before and after the trunnions $b^7$ and lugs $b^8$ on the bolt-tail B' pass to engagement with or disengagement from the inclined portion $c'$ of the frame, so that during such slight movement thereof the unlocking and locking, respectively, in position on said ways of the frame relatively to the receiver, as hereinafter described, may be effected before and after the breech-bolt is respectively retracted from or projected into the breech-aperture.

By means of the actuator-frame C, constructed as described, and the breech-bolt, formed as set forth and having the stated engagement with said frame, when during the rearward throw of the frame on its ways the trunnions $b^7$ and lugs $b^8$ on the bolt-tail pass from the top $c$ of the frame to engagement with the inclined portion $c'$ thereof their downward traverse of said inclined portion, the same being of suitable length for the purpose, will operate to tilt the rearward end of the bolt downwardly and disengage the bolt-shoulder $b^2$ from the lock-shoulder $a$ and bring the upper side of the rearward end of the bolt to its guides $a^2$ in the receiver, as shown in Fig. 14, while the trunnions $b^7$ will then engage the front $c^2$ of the frame and the lugs $b^8$ will enter notches $b^{10}$, which are shown plainly on said frame in Figs. 20 to 23 and Figs. 26 and 29, so that the further rearward throw of the frame and the early and major portion of the succeeding forward throw thereof will, as illustrated in Fig. 17, respectively retract the bolt and project it in the receiver, whereupon during the latter part of the forward throw of said frame the said trunnions $b^7$ and lugs $b^8$ will pass to and reversely or upwardly traverse said inclined portion $c'$ of the frame, thus operating to tilt the rearward end of the bolt upwardly to engage its shoulder $b^2$ to the lock-shoulder $a$, and the said engagement of the bolt by its rearward end to its actuator-frame will give an effective leverage to force a cartridge impelled by the forward end of said bolt to its seat in the firing-chamber. Furthermore, in the gun illustrated, M is the magazine, attached to and having an opening therefrom, usually immediately below the breech-aperture, into the receiver and adapted to receive a charge of several cartridges $m$, held in a known form of clip $m'$, (plainly shown in Figs. 25 and 29,) the upper and under edges of the sides of which clip somewhat overlap the exposed surfaces of the top and bottom cartridges seated therein, and which clip is capable of movement in the magazine toward and from the opening therefrom into the receiver, so that the cartridge immediately adjacent to such opening may be held in or out of the range of the breech-bolt in its closing movement. A spring $m^2$ acts, as through a lever $m^3$, which engages the bottom cartridge in the clip, to successively maintain the cartridges immediately adjacent in said clip to the said receiver-opening, and by the described engagement of the upper edges of the clip sides with the cartridge thus maintained to sustain the clip and its contained cartridges, so that the cartridge immediately adjacent to said receiver-opening will be held in the range of the breech-bolt in its said closing movement.

While the devices comprised in our invention are specially applicable to and may be effectively employed in a gun containing the specific mechanism hereinbefore described and adapted to operate as hereinbefore set forth, they are capable of effective employment in magazine breech-loading bolt-guns generally, either in the forms which we herein show and describe as those we believe preferable or in such modified forms as will not vary from the essential features of our invention, and hence we do not limit ourselves to the employment of our invention in a gun containing the specific mechanism hereinbefore described nor the features of our invention to the specific devices for embodying the same herein set forth.

A feature of our invention consists in a grip for the reciprocatory breech-bolt actuator, as the frame C, composed of a rigid projection thereon extending to and having play on the exterior of the receiver to reciprocate said actuator and transversely slotted adjacently to its junction with said actuator and provided with an extension reaching from and beyond the outward portion thereof opposite to its junction with said actuator, whereby an operating-grip for the breech-bolt actuator may be constituted which may also form a guard for the trigger and which may be conveniently operated in a straight-pull movement by an easy and natural flexion of the elbow of one arm while the gun is held to the shoulder by the other and during which operation of the grip the liability that a finger of the hand will manipulate the firing-trigger is minimized. In embodying this feature of our invention we preferably form the grip projection D rigidly on the under side of and desirably in the same piece with the actuator-frame C to extend to and have play in a longitudinal slot in the under side of the receiver, and in the portion thereof adjacent to its junction with said actuator-frame we form the wide transverse slot $d$ to constitute therein the guard for the trigger T, carried by the actuator-frame C, as described, and on the outward portion of said projection D, opposite to its junction with said frame C, we form the rigid extension $d'$, which reaches from and beyond said outward portion of said projection either in the direction below the receiver, as illustrated generally in the drawings, or in the direction laterally and preferably to the right of the receiver, as illustrated in Fig. 5. We believe it to be desirable to have said extension $d'$ reach, as described, in the direction below the receiver and to give to said united projection and described extension the respective front and rear concave gripping-faces $d^2$ and $d^3$ and to have said faces most widely divergent from each other at the junction of said projection with said actuator-frame—convergent toward each other on said projection and divergent from each other on said extension, the outward or lower end $d^4$ of which latter may be given a flattened curve, as shown. The said extension $d'$ may advantageously be centrally slotted transversely, so that the grip, consisting of said projection and its extension, will be in the form of a skeleton frame having the described contour, with a cross-piece about midway of its length constituting the under side of the trigger-guard.

It is evident that the projection D and its extension $d'$, constructed as set forth, will constitute an operating-grip for the reciprocatory breech-bolt actuator C, which may be conveniently grasped and manipulated by the right hand and with an easy motion of the right arm in a straight-pull movement while the gun is at the shoulder and which also comprises and constitutes a guard for the firing-trigger.

We prefer to provide the described grip device with a locking device adapted to engage the receiver when the said actuator-frame and its grip are thrown forward to the limit of their movement in the direction in the receiver to project the breech-bolt into the breech-aperture, and thereby to lock the said parts in such position, and adapted to be manipulated simultaneously with the grip in the application of effort to the front face $d^2$ of the latter in effecting a rearward throw thereof to release said device from its engagement with the receiver, and thus unlock the frame and grip therefrom, so as to permit the rearward throw thereof and the retraction of the breech-bolt. This device may be conveniently constituted by a spring-actuated lever D', fulcrumed, as in a slotted recess $d^5$, in the upper part of the front side $d^2$ of the grip, with a trigger-arm $d^6$ thereof protruding somewhat beyond the upper portion of the concave face of said front side $d^2$, and a catch-arm $d^7$, adapted by the actuating-spring $d^8$ to engage a notch $c^5$, formed in the under side of each of the ways C', fixed on the receiver-case, when the grip and its frame are at the limit of forward movement in the receiver and the breech-bolt is projected into the breech-aperture.

Now when the grip constructed as described and provided with the locking device specified is manipulated to be thrown forward from the position illustrated in Fig. 17 to that illustrated in Fig. 6 it is evident that the effort applied to the grip for this purpose while the gun is at the shoulder will most naturally be exerted by pressure of the ball of the thumb of the right hand fitting to and pressing upon the rear concave face $d^3$ of the grip, and that consequently the fingers of said hand which may reach around over the front concave face $d^2$ of the grip will naturally be relaxed, so that no pressure will be exerted thereby, and more particularly by the index-finger thereof upon the trigger-arm $d^6$ of the locking-lever D'. Therefore when the grip has been thus pushed to the limit of its forward throw the catch-arm $d^7$ of said locking-lever D' will be free to engage its lock-notch $c^5$. At the conclusion of this movement and when the grip is manipulated to be thrown rearwardly on the receiver from the position shown in Fig. 9 to those shown successively in Figs. 14 and 17 it is evident that, the gun being at the shoulder, as before stated, the fingers of the right hand will naturally grasp and exert pressure upon the face $d^2$ of the front side of the grip, with the initial effect of vibrating the locking-lever D' by the pressure exerted by the index-finger upon the trigger-arm $d^6$ thereof against its spring, thereby releasing the catch $d^7$ from the notch $c^5$, and with the further effect of pulling the released grip rearwardly by an easy and natural bending of the arm at the elbow, with the arm in a position which is favorable to the convenient exertion of such muscular effort. It is furthermore evident that in using the gun as a simple breech-loader, the cartridges for firing being supplied singly from the belt, when the grip is manipulated to push it forward to project the breech-bolt preparatory to firing the hand will be in such position on the grip that it would be awkward and inconvenient, if not in most cases impossible, for a finger of said hand to be during such forward movement inserted in the trigger-guard, so as to pull the firing-trigger T and fire the gun at the instant the grip is locked in forward position, but that owing to the described form of grip and its relation to the trigger T the easiest, most natural, and hence probable, position of said hand during and at the conclusion of the said forward push of the grip will be such that when the grip is locked forward the ball of the thumb will first be relaxed from the rear face $d^3$ of the grip and then the index-finger of the same hand deliberately inserted in the trigger-guard to pull the firing-trigger. It is likewise evident that in using the gun continuously at the shoulder in firing from the magazine when the forward thrust of the grip operates the instant after the parts are locked forward to fire the gun, as hereinafter described, pressure must be exerted by the fingers of the grip-manipulating hand upon the trigger of the locking-lever D' to release the latter before the grip can be pulled rearwardly, thus necessitating a complete reversal of the muscular effort of said hand on the grip at each push and pull thereof. It is therefore apparent that the convulsive or non-predetermined firing of the gun is prevented, and it is also apparent that, owing to the unavoidable lapse of an appreciable moment of time between the instant the firing-trigger is pulled and that at which the trigger-arm of the locking device D' is depressed in single-firing, owing to the necessity of withdrawing the finger from the trigger-guard and placing it on the front face of the grip, or to the similar lapse of time between the instant the forward thrust of the grip operates to release the firing-pin and that at which the trigger-arm of the catch D' is depressed in magazine-firing, owing to the necessity of withdrawing the ball of the thumb from the rear face of the grip and closing the fingers of the hand down upon the front face thereof, there will in either case a sufficient space of time elapse to permit a cartridge the explosion of which may be retarded in the firing-chamber to explode before the breech-bolt is retracted, whereby the danger from hang-fire is avoided.

A further feature of our invention consists in a lever having arms of different lengths fulcrumed in the receiver, with the short arm adapted to engage the breech-bolt provided with devices to grip a cartridge-shell seated in the firing-chamber and with its long arm adapted to be engaged by the breech-bolt actuator to vibrate said lever during the initial part of the operation of said actuator to retract the breech-bolt.

We prefer to constitute this lever in the form shown at E and as illustrated in detail in Fig. 8—that is to say, in the form of a bell-crank, desirably double, fulcrumed at $e$, as in a recess $a^4$, in the upper part of the receiver-case and preferably adjacent to the rearward portion of the breech-bolt B when the latter is projected into the breech-aperture. The said lever has arms of different lengths, the short arm or arms $e'$ and the long arm or arms $e^2$. The lever may be employed in single form; but we prefer the double form, as shown, for the reason that it thus operates more effectively on the breech-bolt. The axis $e^3$ of the said double lever desirably reaches across the receiver-case, and one of the two short arms $e'$, when the bolt is projected into the breech-aperture, extends upon each side thereof immediately forward of and in contact engagement with a pin or stud $b^9$ on each side of the bolt, while one of the two long arms $e^2$ extends to the lower part of the receiver between each of the receiver side walls and the sides of the frame C and lies in the path of a pin or stud $c^6$, projecting from each of said sides of said frame, when said frame moves rearwardly in the receiver. A spring $e^4$ may be employed to act to hold the lever with its arms $e'$ in contact with the pins $b^9$ on the bolt and to vibrate it upwardly and rearwardly in the receiver when such contact engagement is interrupted.

It is evident that after the gun is fired and when the bolt-actuator frame C is moved rearwardly in the receiver from the position indicated in Fig. 9 to that shown in Fig. 14 to unlock the bolt from the shoulder $a$ the short arms $e'$ of the lever E, the same being of suitable length for the purpose, will have the described contact engagement on their rearward sides, near their free ends, with the pins $b^9$ on the bolt, while the pins $c^6$ on the frame C will have established contact engagement with the forward sides, near their free ends, of the long arms $e^2$ of said lever, and that during the initial part of the further rearward movement of the frame C the pins $c^6$ thereon will act to vibrate the lever E rearwardly until they pass under the said ends of and thus escape from engagement with said long arms thereof, said arms being of suitable length for this purpose, thereby causing the short arms $e'$ thereof to act upon the bolt B through the pins $b^9$ to force or withdraw the bolt from the firing-chamber, and consequently to aid in effecting the initiation of the extraction of a spent shell, gripped at its rim by the hook $b$ of said bolt, from said chamber during said movement of said frame C. It is also evident that by means of the described lever E, constructed to operate as set forth, a leverage equaling a multiple of the force applied to the grip may be exerted upon the bolt to start the spent shell from its seat in the firing-chamber and that thus the force exerted upon the grip to extract swelled or jammed shells from the firing-chamber will be minimized, so that the gun may be maintained at the shoulder in magazine-firing and the "line of sight" preserved.

After the described shell-starter lever E has acted as set forth and when the bolt-pins $b^9$ interrupt their contact engagement with the short arms $e'$ thereof during the said further rearward movement of the frame C and the retraction of the bolt B in the receiver the said lever will by its spring $e^4$ be vibrated rearwardly, as illustrated in Fig. 17, so that the long arms $e^2$ thereof will be above the path of the frame-pins $c^6$ during the return or forward movement of the frame and bolt, while the short arms $e'$ will lie in the path of and be engaged by the bolt-pins $b^9$ during such return movement, thereby forwardly vibrating the lever and restoring it to the position shown in Fig. 6 at the conclusion of said return movement and when the gun is cocked ready to fire.

In order that the breech-bolt may be unseated from the breech and thrown rearwardly in the receiver by the frame C without encountering upon said frame, and hence upon the grip, the tension of the spring $p$, which impels the firing-pin P, and in order that the effort to collapse said spring in cocking the gun shall be encountered by said frame and grip only during the final and a minor portion of the return or forward throw thereof and after gathering momentum during the early and major portion of such movement, a further feature of our invention consists in the tailpiece $t'$ of said firing-pin, which plays between the bifurcations of the tail B' of the breech-bolt, and having the forwardly-open and rearwardly-extending recess $r$, opposite to and adapted to receive the cross-piece $c^7$ of the frame C, which cross-piece is constituted on said frame by the formation of the slot in the upward portions $c\ c'$ of said frame, in which the bolt tailpiece plays, as set forth, and of the slot $c^8$ in the front upright portion $c^2$ of the frame, which is provided to permit the adjustment and play therein of other parts of the mechanism. Below the recess $r$ the pin-tail may have the depending sear-engaging extremity $t^2$. The depth of the recess $r$ should be such as to permit the free rearward play therein of the cross-piece $c^7$ of the frame during the rearward movement of the latter from the position shown in Fig. 9, after the gun has been fired, to that shown in Fig. 14 and while the bolt is being thereby unlocked from shoulder $a$ and tilted downward preparatory to its retraction in the receiver, and then to permit the said cross-piece $c^7$ to have such contact engagement with the bottom or rearward side of said recess $r$ as to retract the pin P in the bolt until the forward end or firing-point thereof is flush with the front face of the bolt, as shown in Fig. 14, and to maintain the pin in said position in the bolt during the projection of the bolt from the position shown in Fig. 17 while it is acting to insert a fresh cartridge in the firing-chamber and until the pin-tail is engaged by the sear on said projection of the bolt in cocking the gun, the said retraction of the pin in the bolt serving to prevent contact between the firing-point of the pin and the primer of the cartridge which is being pushed by the bolt into the firing-chamber during the projection of the bolt and the consequent liability to accidentally fire such cartridge. In constructing the said pin-tail for the purposes stated it will be found desirable to form said tail with the rearwardly-extending trilateral frame $t^3$, the interior of which constitutes the described recess $r$ and the lower side of which is preferably narrowed and carries or forms at its forward end the sear-engaging extremity $t^2$, as shown in Figs. 10 and 11.

It is evident that by means of the described recessed tail of the firing-pin the grip is relieved from the stress of the firing-pin spring $p$ during the operation of the grip and its frame C in unlocking the bolt B from shoulder $a$ and also during the operation of the grip and its frame and the hereinbefore-described shell-starter lever E in initiating the extraction of the cartridge-shell from the firing-chamber and that the momentum gathered by the bolt, its actuating-frame, and the grip during the early and major portion of their forward throw will aid in overcoming the increased resistance thereby encountered during the latter and minor portion of said throw due to the collapse of the spring $p$ when the tail of the firing-pin engages the sear in cocking the gun, all of which conduces to minimizing the effort demanded to be exerted upon the grip in operating the gun.

A further feature of our invention consists in a ratchet device interposed between the breech-bolt-operating mechanism and the receiver and adapted to be in engagement during the intervals of movement of said mechanism to either retract or project the breech-bolt and to be released from engagement only when said mechanism reaches the limit of its movement in either said direction in the receiver, whereby when either such movement of the said mechanism in either said direction is begun it must be pursued and completed in the receiver before the movement thereof in the opposite direction can be begun. In carrying out this feature of our invention we prefer to locate the rack of the ratchet device, as at F, on one or both of the ways C' in the receiver of the actuator-frame C and to pivot a pawl F', operating, preferably, by gravity, on said frame, as in a slot $c^9$ in the rearward side $c^3$ thereof, which pawl may be adapted in length to engage in inclined position said rack, as shown in Figs. 20 to 24, and may be recessed from its lower edge to permit it to play over the firing-trigger T, fulcrumed below it in the base $c^4$ of said frame C, as shown plainly in Fig. 24. The rack should be of such a length or duration on the ways that the pawl will be in the described engagement with it during the time the frame C is in position on its ways, as illustrated in Figs. 21 and 23, otherwise than at the limit of its movement in either direction thereon. Recesses $f$ and $f'$ may be formed of such a depth in the ways C' and so adjacent to the respective ends of the rack as to enable the pawl to enter one or the other of them and assume, as by gravity, a vertical position on its pivot at the limit of movement in either direction of the frame C, as illustrated in Figs. 20 and 22.

It is evident that when the frame C, impelled by the grip D and actuating the breech-bolt B, begins a rearward throw in the receiver the engagement of the pawl F' with the rack F, as shown in Fig. 21, will preclude any return or forward movement of the frame and consequent projection of the bolt until the same and their grip have passed to the limit of rearward movement on the ways C', that then the pawl may enter the rear end recesses $f'$ in said ways, as shown in Fig. 22, and thus be enabled, upon the return or forward movement of the bolt, frame, and grip, to reversely engage the said rack, as illustrated in Fig. 23, and that a rearward movement of the bolt, frame, and grip cannot be made until the same have passed to the limit of their forward movement on the ways and the pawl has entered the front end recesses $f$ therein, as shown in Fig. 20; and it is apparent that by means of these described devices the interruption of the complete movement of the said operative mechanism in either direction in the receiver and the opportunity for the breech-bolt to force a cartridge toward the firing-chamber before ejecting a spent shell, and the consequent liability to thereby double load the firing-chamber in operating the gun, are prevented.

A further feature of our invention consists in the combination, with the magazine mechanism which is adapted to successively sustain the cartridges in the magazine at the opening thereof into the receiver, to be successively engaged and seated in the firing-chamber by the breech-bolt in its closing movement in the receiver, and the breech-bolt actuator carrying the firing-trigger, together with a support having play in the receiver and to which the sear is fulcrumed, of fixedly-adjustable controlling devices common to said magazine mechanism and said sear-support and adapted to simultaneously adjust and maintain said magazine mechanism to hold the cartridge which is immediately adjacent in the magazine to the receiver-opening thereof out of the range of the breech-bolt in the receiver in its closing movement and the said sear-support to present the sear to the trigger for a firing vibration of the former by a vibration of the latter, or to hold said cartridge in the range of the breech-bolt in its said movement and the said sear-support to present the sear to the trigger for a firing vibration of the former by the automatic engagement of the former by the latter in the movement of the breech-bolt actuator in the direction to effect said movement of the breech-bolt. In carrying out this feature of our invention in the gun illustrated and described and comprising the magazine mechanism specified we find it preferable to constitute the fulcrum-support for the sear S of a plate $s$, adapted to project into and have vertical play in the slot $c^8$ in the front portion of the actuator-frame C, carrying the trigger T, and to constitute the fixedly-adjustable controlling devices common to the magazine mechanism and said sear-supporting plate of an arm $s'$, a slide $s^2$ working vertically in the magazine-case, and to which slide said arm rigidly connects said plate $s$, while said slide engages the clip $m'$, as by a hook $s^3$, seating in a notch or slot $m^4$ in said clip, and is adapted to be locked to the magazine-case against the stress of the spring $m^2$ at the limit of its movement in the direction to lower said clip in said magazine-case, as by a spring-actuated lever N, vibratory on preferably the outward face of a plate N', into a flanged recess $n'$, on the inward face of which the flanged head of a stud $s^4$ on said slide and playing in a motion-limiting slot $m^5$ in the magazine-case engages, said lever having a detent-arm $n$, which normally engages a lock-notch $m^6$ in the magazine-case. Furthermore, the plate N' is movable on the magazine-case, as vertically, in ways $n^2$ to permit a play thereof over the magazine-case, while the slide $s^2$ plays upwardly therein under the stress of the spring $m^2$ and permits the upward movement of the clip in the magazine. In further carrying out this feature of our invention we prefer to employ a sear S, provided with arms, as $s^5$ and $s^6$, adapted to respectively engage the firing-pin, as by its tail $t^2$ and the arm $t^4$ of the trigger, and which arms are desirably curved or bent laterally, as shown, to permit the free play of said pin-tail over them in firing or cocking the gun, and which sear is fulcrumed on its support s to vibrate thereon against its controlling-spring $s^7$ in the direction at an angle to the plane in which the trigger-engaging arm $s^6$ of the sear and the sear-engaging arm $t^4$ of the trigger lie when said arms are in position for an engagement of the former by the latter—as, for example, at right angles to said plane and laterally of the receiver, as illustrated in the drawings—and we give to the said sear-engaging arm $t^4$ of the trigger in this construction the engagement-face $t^5$, preferably at its extreme end beveled at an angle to said plane—as, for example, vertically of said arm diagonally from an upper to the opposite lower edge thereof, as illustrated—and we give to the trigger-engaging arm $s^6$ of the sear an engagement end $s^8$, beveled at an angle to said plane—as, for example, laterally from one side edge at its extremity to the opposite side edge thereof, as illustrated.

It is evident that when the described trigger overlaps the sear vertically at the limit of its forward movement with the frame C, the described sear-support s being adjusted downwardly of the receiver for this purpose, as shown in Fig. 25, a vibration of the trigger will, by the sidewise engagement of its sear-engaging arm $t^4$, with the arm $s^6$ of the sear and the consequent traverse of the beveled end $t^5$ of the said arm of the sear, vibrate the sear, or that when, as illustrated in Fig. 29, the described trigger approaches the sear in the forward movement of the frame C and rigidly supported in normal position therein the endwise engagement of its sear-engaging arm with the trigger-engaging arm of the sear and the consequent traverse by said trigger-arm of the beveled end of said sear-arm will also vibrate said sear, and that such vibration of said sear will in either case effect the disengagement of the arm $s^5$ of the sear from the firing-pin tail, thereby firing the gun. In further carrying out this feature of our invention we preferably provide a motion interrupter or stop for the controlling devices which are common to the sear-support and the magazine-clip and desirably located on the breech-bolt actuator—as, for example, a stud $c^{10}$, fixed on the inward side of the slotted upright front portion $c^2$ of the frame C and adapted to reach over the sear-support s or a projection $s^9$ thereon at a distance above the same less than the distance between the lower side of the arm $t^4$ of the trigger and the upper side of the arm $s^6$ of the sear, when said support s and the slide $s^2$ are locked in the position illustrated in Fig. 25, with said arm of the trigger in normal position in said frame C overlapping sidewise the said arm of the sear.

Now it is evident that when the several parts are in the relative positions illustrated in Figs. 1, 6, and 25, with the breech-bolt closed and the gun cocked, and the detent-arm n of the lever N is then unlocked and the slide $s^2$ thus released, the spring $m^2$ will act to raise the clip $m'$ and its contained cartridges, and consequently the slide $s^2$ and sear-support s, until the said movement of said devices is interrupted by the encounter of the support projection $s^9$ with the frame-stud $c^{10}$, and that the gun may then be deliberately fired by the usual manipulation of the trigger, its accidental discharge being prevented by the said interruption of the described movement of the sear-support before the arm $s^6$ of the sear encounters the arm $t^4$ of the trigger, and that as soon as the grip is manipulated to initiate the rearward throw of the frame C and breech-bolt the stud $c^{10}$ on said frame will be withdrawn from contact with the support s, as indicated in Fig. 29, so that the described magazine-clip and sear-controlling devices may move to the limit of their upward movement as defined by the slots $m^5$ in the magazine-case, the length of said slots being such as will permit the slide $s^2$ to rise under the tension of spring $m^2$ until the clip $m'$ is in position to enable its contained cartridges to be successively presented in the range of the breech-bolt in its closing movement and until the support s is simultaneously in position to present the beveled end $s^8$ of the arm $s^6$ of the sear endwise in the path of the arm $t^4$ of the trigger when said trigger is in rigid normal position on the frame C and said frame is about to complete a forward throw in the receiver. It is furthermore evident that when the gun is cocked and the described adjustment of the sear from its lowered to its elevated position in the receiver takes place, as set forth, the said sear, being vibratory only at an angle to the plane in which its support moves in effecting said adjustment, such vibration being laterally only of the receiver in the gun illustrated, will preserve its engagement by its arm $s^5$ with the tail of the fixing-pin, and that hence the accidental discharge of the gun by an escape of said sear-arm from said pin-tail during said operation of adjustment will be avoided. It is also evident that when the breech-bolt is retracted, as indicated in Figs. 14 and 17, the described adjustment of the magazine-clip and the sear-support from their lowered to their elevated position may be freely and uninterruptedly effected by the described release of their common controlling devices from their locked lowered position. It is furthermore evident that while the magazine-clip and its cartridges and said sear are adjusted and maintained in the described elevated position and the actuator-frame C, carrying the bolt, completes a projection in the receiver the stud $c^{10}$ on said frame will escape the sear-support s by passing under the projection $s^9$ thereon, and thus be no impediment to such throw, and that the said magazine-clip and its cartridges and said sear may be readjusted from their raised to their lowered position at any time, when the frame C is thrown rearwardly sufficiently to permit the stud $c^{10}$ to pass to the rear of the support projection $s^9$ by drawing the plate $n'$, as by a grasp with the hand, downwardly until the detent-arm $n$ of lever N again locks in the notch $m^6$. It is therefore apparent that while by means of the described controlling devices common to the magazine mechanism and the firing mechanism the magazine-clip and its contained cartridges and the sear may be simultaneously adjusted and maintained in position in the gun, so that the magazine will be out of use and the firing mechanism can be operated only by a distinct manipulation of the trigger to effect a firing vibration of said sear, the said magazine-clip and its contained cartridges and said sear may be simultaneously adjusted and maintained in position to bring the magazine into use and to effect the operation of the firing mechanism at each reciprocation of the grip to successively fire the gun until the contents of the magazine are exhausted by the automatic engagement of the trigger with the sear in each throw of the breech-bolt actuator in the direction to project the breech-bolt.

The further feature of our invention consists in the combination, with a plate which is movable on the exterior of the gun synchronously with the movement of the magazine mechanism therein to adjust the magazine in or out of use in firing, of an area on the exterior of the gun having a color different to that of either the surrounding surface of the gun or the external face of the said movable plate and located to be covered and concealed by the said plate when the same is at the limit of its said movement with said magazine mechanism, when the latter adjusts the magazine either in or out of use. In carrying out this feature of our invention we prefer to employ the plate N', which has movement, as vertically, over the exterior face of the magazine-case, as set forth, synchronously with the movement of the slide $s^2$ of the common controlling devices of the magazine-clip and sear; and we prefer to compose the plate of two wings or sections united by a section arranged to extend around the rearward end of the magazine and with each wing to reach over one of the opposite side faces thereof, as illustrated in Fig. 4, and in this construction the slide $s^2$ may be advantageously given similar flanged studs $s^4$ on its opposite sides, playing in similar slots $m^5$ in the magazine-case and with their heads seated and playing in similar flanged recesses $n'$ in the internal surfaces of each wing of the plate N', as shown in Fig. 4. In further carrying out this feature of our invention we prefer to give to the external face of the plate-wings the same color, such as steel blue, as the exterior of the magazine-case and to give to an area, as at $N^2$, on each outward side of said magazine-case a different and preferably vivid color—such as red, yellow, or white—and which area is adapted in extent and located, as illustrated, to be covered and concealed by the said plate-wings when said plate is at the limit of its downward movement and to be uncovered and exposed by said wings when said plate is at the limit of its reverse or upward movement over the magazine-case synchronously with the movement upward and downward, respectively, of the slide $s^2$ of the devices commonly controlling the adjustment of said magazine-clip and sear, as set forth. By means of this feature of our invention it is evident that the adjustment of the gun, whether for use in magazine or single firing, will be visually indicated by a distinct signal on the exterior of the gun, readily recognizable, as by an officer in command, and we believe that the unauthorized use of the magazine being easily detectable such use will be deterred, so that when the emergency arises which demands the use of the magazine the reserve of cartridges therein will be complete and intact.

What we claim as our invention, and desire to secure by Letters Patent, is—

1. In a breech-loading gun in which the breech-bolt grips a cartridge-shell in the firing-chamber, the combination with said breech-bolt and the breech-bolt actuator, of a lever having arms of different lengths, with its short arm engaging the breech-bolt and its long arm engaged by the breech-bolt actuator during the initial part of the movement of said actuator to retract the breech-bolt; whereby a multiple of the effort exerted upon said actuator will be exerted upon the breech-bolt to start the cartridge-shell from the firing-chamber.

2. In a breech-loading gun in which the breech-bolt reciprocates to open and close the breech-aperture and grips a cartridge-shell in the firing-chamber, the combination with said breech-bolt and the breech-bolt actuator, of a lever having arms of different lengths, with its short arm engaging the breech-bolt and its long arm engaged by the breech-bolt actuator during the initial part of the movement of said actuator to retract the breech-bolt; whereby a multiple of the effort exerted upon said actuator to retract the breech-bolt will be exerted on said breech-bolt to start a cartridge-shell from the firing-chamber.

3. In a breech-loading gun in which the breech-bolt and its actuator reciprocate in the receiver to open and close the breech-aperture, and said bolt grips a cartridge-shell in the firing-chamber, the combination therewith, of a lever, fulcrumed in the receiver and having arms of different lengths, with its short arm engaging the breech-bolt and its long arm engaged by said actuator during the initial part of the throw of the latter to retract the former; whereby the actuator in the said part of its said throw will vibrate said lever against the breech-bolt.

4. In a breech-loading gun in which the breech-bolt is directly engaged at its rearward end by the breech-bolt actuator, which is operative within the receiver to reciprocate said bolt to open and close the breech-aperture, and said bolt grips a cartridge-shell in the firing-chamber, the combination therewith, of a lever, fulcrumed in the receiver and having arms of different lengths, with its short arm engaging the breech-bolt and its long arm engaged by said actuator during the initial part of the movement of said actuator to retract the breech-bolt; whereby, while said actuator will act to vibrate said lever against the breech-bolt, it will also directly exert an effective leverage on said bolt to withdraw it from and project it into the breech-aperture.

5. In a breech-loading gun in which the breech-bolt reciprocates in the receiver to open and close the breech-aperture and grips a cartridge-shell in the firing-chamber, and has a depending tail by which it is engaged to and actuated by a frame which is reciprocatory on ways rearwardly of and below said bolt in the receiver, the combination therewith, of a bell-crank lever having a short arm engaging said bolt and a long arm engaged by said frame during the initial part of a throw thereof on its ways to retract the breech-bolt; whereby the said lever may be fulcrumed in the receiver with its arms reaching to said respective engagements.

6. In a breech-loading gun in which the breech-bolt reciprocates in the receiver to open and close the breech-aperture and grips a cartridge-shell seated in the firing-chamber, the combination with said breech-bolt and the breech-bolt actuator, of a spring-actuated lever, fulcrumed in the receiver and provided with arms of different lengths, and having the shorter of said arms in engagement with said bolt and the longer of said arms engageable by said actuator during the initial part of the movement of the actuator to retract the bolt; and having the longer of said arms escape said actuator and the shorter of said arms engageable by said bolt during the reverse movement of the actuator to project the bolt toward the breech-aperture; whereby, after said lever acts upon said bolt in the retraction thereof, it will be vibrated to position for a succeeding action thereon.

7. In a breech-loading gun in which the breech-bolt reciprocates in the receiver to open and close the breech-aperture and grips a cartridge-shell seated in the firing-chamber, and said bolt is actuated by a frame which reciprocates on ways rearwardly of and below said bolt in the receiver, the combination therewith, of a spring-actuated lever, fulcrumed in the receiver and having arms of different lengths, a stud, or studs, on said bolt to the rearward and near the free ends of the shorter arm, or arms, and a stud, or studs, on said actuator-frame, forward and near the free ends of the longer arm, or arms, of said lever; whereby, when said frame is thrown to retract said bolt, the stud, or studs, on the frame will temporarily engage said long arm, or arms, of said lever and vibrate the same to engage its short arm, or arms, with the stud, or studs on the bolt; and when said frame is reversely thrown to project the bolt toward the breech-aperture, said stud, or studs, on said frame will escape said long arm, or arms, and said stud, or studs, on said bolt will engage said short arm, or arms, of said lever and reversely vibrate the same.

8. In a breech-loading gun, the combination with the breech-bolt which reciprocates in the receiver to open and close the breech-aperture and grips a cartridge-shell in the firing-chamber, a frame reciprocatory on ways in the receiver and having a slotted, forwardly and downwardly inclined top, and a tailpiece on the breech-bolt which plays in and engages and traverses said top of said frame, to withdraw the bolt from or project it into the breech-aperture, of a spring-actuated lever, fulcrumed in the receiver and having a short arm engaging the breech-bolt and a long arm engaged by said frame during the early portion of a further rearward throw thereof, at the conclusion of the downward traverse of the inclined top thereof by said tailpiece of the breech-bolt during the initial portion of said throw of said frame, and the said short arm engaged by the breech-bolt during the latter part of a forward throw of said frame, immediately before the upward traverse of said inclined top thereof by the tailpiece of the breech-bolt; whereby the vibrations of said lever will be effected respectively after and before the breech-bolt is withdrawn from and projected into the breech-aperture.

9. In a breech-loading gun in which the breech-bolt actuator is reciprocatory in the receiver, the combination therewith, of a rigid projection thereon, extending to and having play on the exterior of the receiver, and transversely slotted adjacently to its junction with said actuator, and provided with a rigid extension reaching from and beyond the outward portion of said projection, opposite to the junction thereof with said actuator; whereby an operating-grip for said actuator may be constituted which will also form a guard for the trigger, and which may be conveniently operated while the gun is at the shoulder, and during the reciprocation of which the liability to simultaneously manipulate the trigger is minimized.

10. In a breech-loading gun in which the breech-bolt actuator is reciprocatory in the receiver, the combination therewith, of a rigid projection thereon, extending to and having play on the under side of the receiver and transversely slotted adjacently to its junction with said actuator, and provided with an extension reaching from and beyond the outward portion of said projection, opposite to the junction thereof with said actuator; whereby a "straight-pull" grip to reciprocate said actuator and also forming a trigger-guard, may be constituted on the under side of the receiver, with said trigger-guard immediately adjacent to the receiver and the body of said grip extended below said guard.

11. In a breech-loading gun in which the breech-bolt actuator is reciprocatory in the receiver, the combination therewith, of a rigid projection thereon, extending to and having play on the under side of the receiver, and transversely slotted adjacently to its junction with said actuator, and provided with an extension reaching from and beyond the outward portion of said projection, opposite to the junction thereof with said actuator, in the direction below the receiver, the said united projection and its extension having front and rear concave faces; whereby a grip to operate said actuator, and comprising a guard for the trigger, may be constituted on the under side of the receiver and be given effective manipulation-faces for the reciprocation thereof.

12. In a breech-loading gun in which the breech-bolt actuator is reciprocatory in the receiver, the combination therewith, of a rigid projection thereon, extending to and having play on the exterior of the receiver, and transversely slotted adjacently to its junction with said actuator, to therein constitute a trigger-guard, and provided with an extension reaching from and beyond the outward portion of said projection, opposite to the junction thereof with said actuator, to constitute with said projection an operating-grip for said actuator, together with a locking-lever fulcrumed in said grip and which releasably locks to the receiver when said actuator with its said grip is at the limit of a throw to project the breech-bolt into the breech-aperture; whereby the parts will be locked in position when the breech-aperture is closed and must be unlocked before the actuator can be reversely thrown to retract the breech-bolt.

13. In a breech-loading gun in which the breech-bolt reciprocates in the receiver to open and close the breech-aperture, and is directly engaged at its rearward end with its actuator which is reciprocatory in the receiver, the combination therewith, of a rigid projection on the actuator, extending to and having play on the exterior of the receiver, and transversely slotted adjacently to its junction with said actuator, to constitute a trigger-guard, and an extension reaching from and beyond the outward portion of said projection, opposite to the junction thereof with said actuator, to constitute therewith an operating-grip for said actuator; whereby the effort applicable to the grip to throw the actuator to retract or project the bolt is minimized.

14. In a breech-loading gun in which the breech-bolt is reciprocatory in the receiver to open and close the breech-aperture, and is engaged and thrown by an actuator reciprocatory on ways in the receiver, the combination therewith, of a rigid projection on said actuator, extending to and having play on the under side of the receiver, and transversely slotted adjacently to its junction with said actuator, to therein constitute a trigger-guard, and an extension, reaching from and beyond the outward portion of said projection, opposite to its junction with said actuator, in the direction below the receiver, the said united projection and extension having front and rear concave manipulation-faces and constituting an operating-grip for said actuator, together with a spring-actuated lever, fulcrumed in the upper part of said front face, with an arm which protrudes beyond said face, and with a catch-arm which engages a lock-notch in the actuator-ways when said actuator is at the limit of a throw to project the breech-bolt; whereby, in the manipulation of the front face of the grip to retract the actuator and breech-bolt, the said locking-lever will be vibrated to unlock it from said actuator-ways.

15. In a breech-loading gun in which the breech-bolt actuator reciprocates in the receiver to operate the breech-bolt, the combination therewith, of a skeleton frame, projecting therefrom to and having play on the under side of the receiver, and having front and rear concave sides which are most widely divergent from each other at the junction of said frame with said actuator, and which converge toward each other to about midway of the projection of said frame from said actuator, and thence diverge from each other to the outer end of said frame, together with a cross-piece extending between said front and rear sides; whereby said frame constitutes an operating-grip for the actuator and comprises a guard for the trigger.

16. In a breech-loading gun in which the reciprocatory breech-bolt carries a spring-impelled firing-pin and is actuated by a slotted frame which engages the rearward end of said bolt and is reciprocatory on ways in the receiver, the combination with said firing-pin, of a tailpiece thereon playing in said slotted frame and provided with a forwardly-open and rearwardly-extending recess, which receives and permits the rearward play therein of a side of said slotted frame, during the rearward throw thereof to retract the breech-bolt, and the rearward side of which recess engages said side of said frame, during the bolt-projecting throw thereof; whereby, while the breech-bolt is directly engaged by its actuating-frame, said frame will be free from the tension of the impelling-spring of the firing-pin during its bolt-retracting throw; and, whereby the firing-pin will be retracted in the breech-bolt during the projection of said bolt.

17. In a breech-loading gun in which the reciprocatory breech-bolt carries a spring-impelled firing-pin, and is actuated by a slotted frame which engages the rearward end of said bolt and is reciprocatory in the receiver, the combination with said firing-pin, of a tailpiece thereon, composed of a trilateral frame open on its forward side and playing in said slotted frame to the rear of the forward side thereof; whereby, when said slotted frame is thrown to retract the breech-bolt, its forward side will play in said trilateral frame on the firing-pin, and, when said slotted frame is thrown to project the breech-bolt, said forward side thereof will engage against the rearward side of said trilateral frame.

18. In a breech-loading gun, the combination with the breech-bolt-operating mechanism and the receiver, of a ratchet device interposed between said mechanism and the receiver and having its members in engagement throughout the duration of movement of said mechanism in either direction, and to be disengaged only when said mechanism is at the limit of movement in either direction; whereby, when a movement of said mechanism is begun, it must be pursued and completed before a reverse movement thereof can be effected.

19. In a breech-loading gun, the combination with a breech-bolt actuator which is reciprocatory in the receiver, of a ratchet device interposed between said actuator and the receiver and having its members in engagement throughout the duration of each throw of said actuator, and to be disengaged only when said actuator is at the limit of a throw; whereby, when a throw of the actuator to either retract or project the breech-bolt is begun, it must be pursued and such bolt retraction or projection completed before a reverse throw can be made.

20. In a breech-loading gun in which the breech-bolt is reciprocated to open and close the breech-aperture and to extract and eject spent shells from and seat cartridges in the firing-chamber, and is engaged and impelled by a frame reciprocatory on ways in the receiver, the combination therewith, of a ratchet device interposed between said frame and its ways, and having its members in engagement throughout the duration of each throw of said frame on said ways, and to be disengaged only when said frame is at the limit of a throw; whereby, when the retraction or projection of the bolt is begun and the extraction and ejection of a shell or the seating of a cartridge thereby is initiated, such movement and function must be completed before the reverse thereof can be effected.

21. In a breech-loading gun in which the breech-bolt is reciprocated in the receiver to open and close the breech-aperture, and is engaged and actuated by a frame which reciprocates on ways in the receiver, the combination therewith, of a pawl pivoted on said frame and a rack on said ways, one or both, engageable by said pawl, together with recesses provided in said ways immediately adjacent to the respective ends of said rack; whereby the pawl may engage said rack during the entire of a throw of said frame on its ways in either direction, to retract or project the breech-bolt, and may escape said rack when said frame is at the limit of a throw, so as to reversely engage the rack during the succeeding throw of the frame.

22. In the firing mechanism of a breech-loading gun, comprising a spring-impelled firing-pin and a trigger reciprocatory in a rigidly-supported position, relatively to the sear, the combination therewith, of a sear having arms to respectively engage said firing-pin and said trigger, and fulcrumed to vibrate in a direction at an angle to the plane in which the trigger-engaging arm of said sear and the sear-engaging arm of said trigger lie when in position for an engagement of the former by the latter; the said arm of the sear having an engagement end beveled at an angle to said plane; whereby a throw of said trigger to endwise engagement with the sear and the traverse of the said engagement end of the trigger-engaging arm thereof by the sear-engaging arm of the trigger, will vibrate the sear to disengage its other arm from the firing-pin.

23. In the firing mechanism of a breech-loading gun, comprising a spring-impelled firing-pin and a trigger which is alternatively vibratory, or reciprocatory in a rigidly-supported position, relatively to the sear, and has a sear-engaging arm which overlaps the trigger-engaging arm of the sear when said trigger is at the limit of a throw toward said sear, the combination therewith, of a sear, fulcrumed on a support having adjustability in the direction parallel to the plane in which the said arms of the trigger and sear lie when in position for an engagement of the latter by the former, and vibratory at right angles to said plane, the said trigger and sear arms respectively having an engagement face and an engagement end which are severally vertically and laterally beveled at an angle to said plane; whereby the trigger-engaging arm of the sear may be presented to the sear-engaging arm of the trigger for either a sidewise or endwise engagement of the former by the latter; and, whereby, when such presentation for endwise engagement thereof is made, a throw of the trigger, in its reciprocation, to the sear will effect the vibration of said sear, and, when such presentation for sidewise engagement thereof, at the limit of said throw of the trigger, is made, a vibration of the trigger will effect the vibration of the sear; in either case releasing the arm thereof which engages the firing-pin from engagement therewith.

24. In a magazine breech-loading gun, comprising a magazine mechanism which successively sustains the cartridges in the magazine at the opening thereof into the receiver and in or out of the range of the breech-bolt in its projection movement, and a sear, fulcrumed on a support having adjustability in the receiver, relatively to the trigger, the combination with said magazine mechanism and said sear-support, of controlling devices common thereto and which simultaneously adjust and maintain said magazine mechanism to hold the cartridges out of said range of the breech-bolt, and the said sear-support to present the sear to the trigger for a firing vibration of the former by a vibration of the latter; or to hold a cartridge in said range of the breech-bolt, and to present the sear to the trigger for a firing vibration of the former by the automatic engagement therewith of the latter; whereby the gun may be adjusted for use as a simple breech-loader and fired by a distinct manipulation of the trigger, or as an automatic magazine-repeater.

25. In a magazine breech-loading gun, comprising a magazine mechanism which successively sustains the cartridges at the opening into the receiver and in or out of the range of the breech-bolt in its projection movement, a breech-bolt which engages a cartridge in its said range and seats it in the firing-chamber in its said movement, a reciprocatory breech-bolt actuator carrying the trigger which is therein vibratory from a rigidly-supported normal position, and a sear, fulcrumed on a support having adjustability in the receiver relatively to the trigger, the combination therewith, of controlling devices common to said magazine mechanism and said sear-support and which simultaneously adjust and maintain said magazine mechanism to hold the cartridges out of said range of the breech-bolt, and the sear-support to present the sear to the trigger for a firing vibration of the former by a vibration of the latter at the conclusion of a throw of said actuator to project the bolt; or to hold a cartridge in said range of said bolt, and to present the sear to the trigger for a firing vibration of the former by the automatic engagement therewith of the latter at said conclusion of said throw of the actuator; whereby, when the gun is adjusted for use as a simple breech-loader, it may be fired by a distinct manipulation of the trigger, and when it is adjusted as a magazine-repeater, it may be automatically fired by the operation of the breech-bolt actuator.

26. In a magazine breech-loading gun comprising a magazine mechanism which successively sustains the cartridges at the opening into the receiver and in or out of the range of the breech-bolt in its projection movement, a breech-bolt which engages a cartridge in its said range and seats it in the firing-chamber in its said movement, a reciprocatory breech-bolt actuator carrying the trigger which is therein vibratory from a rigidly-supported normal position, and a sear, fulcrumed on a support having adjustability in the receiver relatively to the trigger, said sear and trigger effecting a firing vibration of the former by either a sidewise or endwise engagement therewith of the latter, the combination therewith, of controlling devices common to said magazine mechanism and said sear-support and which simultaneously adjust and maintain said magazine mechanism to hold the cartridges out of said range of the breech-bolt, and the sear-support to present the sear to the trigger sidewise thereof at the conclusion of a throw of said actuator to project the bolt, or to hold a cartridge in said range of the bolt, and the sear-support to present the sear to the trigger endwise thereof at said conclusion of said throw of the actuator; whereby a firing vibration of the sear may be alternatively effected by either a vibration of the trigger, or the automatic engagement thereof with said sear in the throw of the breech-bolt actuator to project the breech-bolt.

27. In a magazine breech-loading gun having an adjustable magazine mechanism comprising a cartridge-holding means sustained in normal position adjacent to the opening into the receiver, with means to successively sustain the cartridges, when in normal position, in the range of the breech-bolt in its projection movement, a breech-bolt which engages a cartridge in its said range and seats it in the firing-chamber in its said movement, a reciprocatory breech-bolt actuator carrying the trigger vibratory therein from a rigidly-supported normal position, and a sear fulcrumed on a support having adjustability in the receiver to present said sear to the trigger either sidewise or endwise thereof, for a firing vibration of the former by either a vibration of or encounter with the latter at the conclusion of a throw of said actuator to project the bolt, the combination therewith, of a movable slide engaging said cartridge-holding means and having an arm rigidly connecting it to said sear-support, and which locks to the magazine-frame when at its limit of movement to retract said cartridge-holding means from the opening into the receiver and to adjust said sear-support to present the sear sidewise to the trigger, and which may be released to permit said cartridge-holding means to be sustained in its said normal position and to adjust said sear-support to present the sear endwise to the trigger; whereby, by the manipulation of said slide, the gun may be adjusted for use as a simple breech-loader or as an automatic magazine-repeater.

28. In a magazine breech-loading gun in which the magazine-frame receives and permits the play therein toward and from the opening into the receiver of a cartridge-holding means, and in which a spring commonly acts to sustain the said cartridge-holding means in normal position at the limit of its play toward said opening and to successively sustain the cartridges in the range of the breech-bolt in its projection movement, the combination therewith, of a movable slide engaging said cartridge-holding means, an arm carried by said slide and reaching into the receiver, a fulcrum-plate for the sear supported by said arm in the receiver, and a locking device carried by said slide which releasably locks the same against the tension of said spring when at its limit of movement to retract the cartridges from the receiver-opening; whereby, when said slide is moved to its said locked position, or is released and permits said cartridge-holding means to be sustained in said normal position, the said fulcrum-plate for the sear will be simultaneously moved in the receiver.

29. In a magazine breech-loading gun in which the magazine-frame receives and permits the play therein toward and from the opening into the receiver of a cartridge-holding means, and in which a spring commonly acts to sustain said cartridge-holding means in normal position at the limit of its play toward said opening and to successively sustain the cartridges in the range of the breech-bolt in its projection movement, the combination therewith, of a movable slide which engages said cartridge-holding means, an arm carried by said slide and reaching into the receiver, and a fulcrum-plate for the sear supported by said arm in the receiver, together with a flanged stud on said slide reaching through and playing in a motion-limiting slot in the magazine-frame, a plate movable on said frame and which engages the flange of said stud, and a spring-actuated lever carried by said plate and having an arm which releasably engages a lock-notch in said frame when said slide and plate are at the limit of movement to retract the cartridge-holding means from the receiver-opening; whereby the movements of said slide may be defined and its detention in position be secured in effecting the simultaneous adjustment of said cartridge-holding means and said fulcrum-plate.

30. In a magazine breech-loading gun in which the trigger and sear effect a firing vibration of the latter by either a sidewise or endwise engagement therewith of the former, and in which the trigger is vibratory and reciprocatory in a rigidly-supported position relatively to the sear, and in which a support, on which the sear is fulcrumed, is movable in the receiver from the position in which it presents the sear to the trigger sidewise thereof to that in which it presents said sear to said trigger endwise thereof, the combination with said sear-support, of a stop movably mounted in the receiver and which engages said support before said trigger, thrown to sidewise presentation to the sear, encounters said sear, when said sear-support is moved in the direction from the position in which it presents the sear sidewise to that in which it presents the sear endwise to the trigger, and disengages said support when the trigger is thrown from said sidewise presentation to the sear; whereby the movement of said sear-support in said direction, in effecting an adjustment thereof when the breech-aperture is closed, will be interrupted and a firing vibration of the sear when the gun is cocked prevented, and said movement of the sear-support may be completed when the breech-aperture is opened.

31. In a magazine breech-loading gun in which the trigger and sear effect a firing vibration of the latter by either a sidewise or endwise engagement therewith of the former, and in which the trigger is carried by and is vibratory from a rigidly-supported position in the reciprocatory breech-bolt actuator, and the sear is fulcrumed on a spring-actuated support, normally in position in the receiver to present said sear to the trigger endwise thereof, and adjustable and detainable against the tension of its spring to present said sear to the trigger sidewise thereof, the combination with said sear-support, of a stop, movably mounted in the receiver and which engages said support before said trigger, thrown to sidewise presentation to said sear by said actuator, encounters said sear when said support is released to the action of its spring from its said detained position of adjustment, and disengages said support and frees it to the impulse of its spring when the trigger is thrown from said sidewise presentation to the sear by said actuator; whereby the movement of said support in said direction by its spring when the breech-aperture is closed will be interrupted, and may be resumed and completed when the breech-aperture is opened.

32. In a magazine breech-loading gun in which the trigger and sear effect a firing vibration of the latter by either a sidewise or endwise engagement therewith of the former, and in which the trigger is carried by and is vibratory from a rigidly-supported position in the reciprocatory breech-bolt actuator, and the sear is fulcrumed on a support adjustable in the receiver from the position to present the sear to the trigger sidewise to that to present the same endwise thereof, the combination therewith, of a stop mounted on said actuator, and which engages and interrupts the movement of said support before said trigger, thrown to sidewise presentation to said sear by said actuator, encounters said sear, when said support is moved in the direction from the position to present said sear sidewise to that to present the same endwise to the trigger, and disengages said sear-support when the actuator is thrown to withdraw the trigger from said sidewise presentation to the sear; whereby said stop will be in position to engage said support when said actuator is thrown in the direction to effect the closing of the breech-aperture, and will be moved to escape said support when said actuator is reversely thrown.

33. In a magazine breech-loading gun in which the trigger and sear effect a firing vibration of the latter by either a sidewise or endwise engagement therewith of the former, and in which the trigger is carried by and is vibratory from a rigidly-supported position in a frame which is reciprocatory in the receiver and engages and impels the breech-bolt, and the sear is fulcrumed on a support which projects into a slot in said frame and is rigidly connected by an arm to a movable slide on and releasably engageable to the magazine-frame against the tension of a spring therein at the limit of movement of said slide to adjust said support to present said sear to the trigger sidewise thereof, the combination therewith, of a stud located on said reciprocatory frame at a distance from said support less than that between said sear and trigger when the latter is thrown to sidewise presentation to the former by said reciprocatory frame, and projecting into the path of said support in its movement in the direction to adjust the same to present the sear endwise to the trigger at the release of said slide from its engagement to the magazine-frame, and which escapes said support in the reciprocation of said frame; whereby the said stud will engage and interrupt the movement of said support in said direction, while said frame may be freely reciprocated in the receiver.

34. In a magazine breech-loading gun in which the magazine mechanism adjusts the cartridge-holding means in or out of use in firing, the combination therewith, of a plate, synchronously movable on the exterior of the gun with said mechanism in its movements to adjust the charge of cartridges, together with an area on the exterior of the gun having a color different to that of either the gun or said plate, and located to be covered and concealed by said plate when at the limit of its movement with said mechanism in adjusting the charge of cartridges either in or out of use, and to be uncovered and exposed by said plate in its reverse movement; whereby the nature of the said adjustment will be indicated by a visible signal on the gun.

35. In a magazine breech-loading gun in which the magazine mechanism adjusts the cartridge-holding means in or out of use in firing, the combination therewith, of a plate, synchronously movable on the exterior of the gun with said mechanism in its movements to adjust the charge of cartridges, and the color of the external face of which is similar to that of the gun, together with an area on the exterior of the gun having a different color and located to be covered and concealed by said plate when at the limit of its movement with said mechanism in adjusting charge of cartridges out of use, and to be uncovered and exposed when at the limit of its movement with said mechanism in adjusting the charge of cartridges in use; whereby a spot of vivid color may be made visible on the gun when the charge of cartridges is adjusted to be in use.

36. In a magazine breech-loading gun in which the magazine mechanism adjusts the magazine charge in or out of use in firing, the combination therewith, of a plate, or plates, movably mounted on the exterior of the sides, one or both, of the magazine-frame and externally of similar color to that of said faces of said frame, and connected to said mechanism to move synchronously therewith in adjusting the magazine charge, together with an area on said sides, one or both, of the magazine-frame, having a color different to said faces and said plates, and located to be covered and concealed, or uncovered and exposed, by said plate or plates, in their said movement with said mechanism in adjusting the charge of cartridges respectively in or out of use; whereby a color-signal may be made visible on the exterior of the magazine-frame indicative of the nature of the adjustment of the contained charge of cartridges.

37. In a magazine breech-loading gun in which a cartridge-holding means is movable in the magazine-frame toward and from the opening into the receiver, and in which a spring acts to sustain said cartridge-holding means at the limit of its movement toward said opening, the combination therewith, of a movable plate on the exterior of the gun, and a slide which commonly engages said cartridge-holding means and said plate and is releasably locked to the gun to hold said cartridge-holding means against its said spring at the limit of movement from said receiver-opening, together with an area on the exterior of the gun having a color different to that of the gun-surface or said plate and located to be covered and concealed by said plate when said slide is in said locked position, and to be uncovered and exposed when said slide is released to the action of its said spring; whereby, when the charge of cartridges is at the opening into the receiver, a spot of vivid color may be visible on the gun, and, when said charge of cartridges is withdrawn from said opening, the said color-spot will be concealed.

GEORGE L. PUTNAM.
CHARLES H. FARMER.

Witnesses:
ARDEN S. FITCH,
ALFRED B. MARLAY.